Nov. 2, 1965
G. E. SMITH ETAL
3,215,921
CONTROL DEVICES
Filed June 15, 1959
6 Sheets-Sheet 1
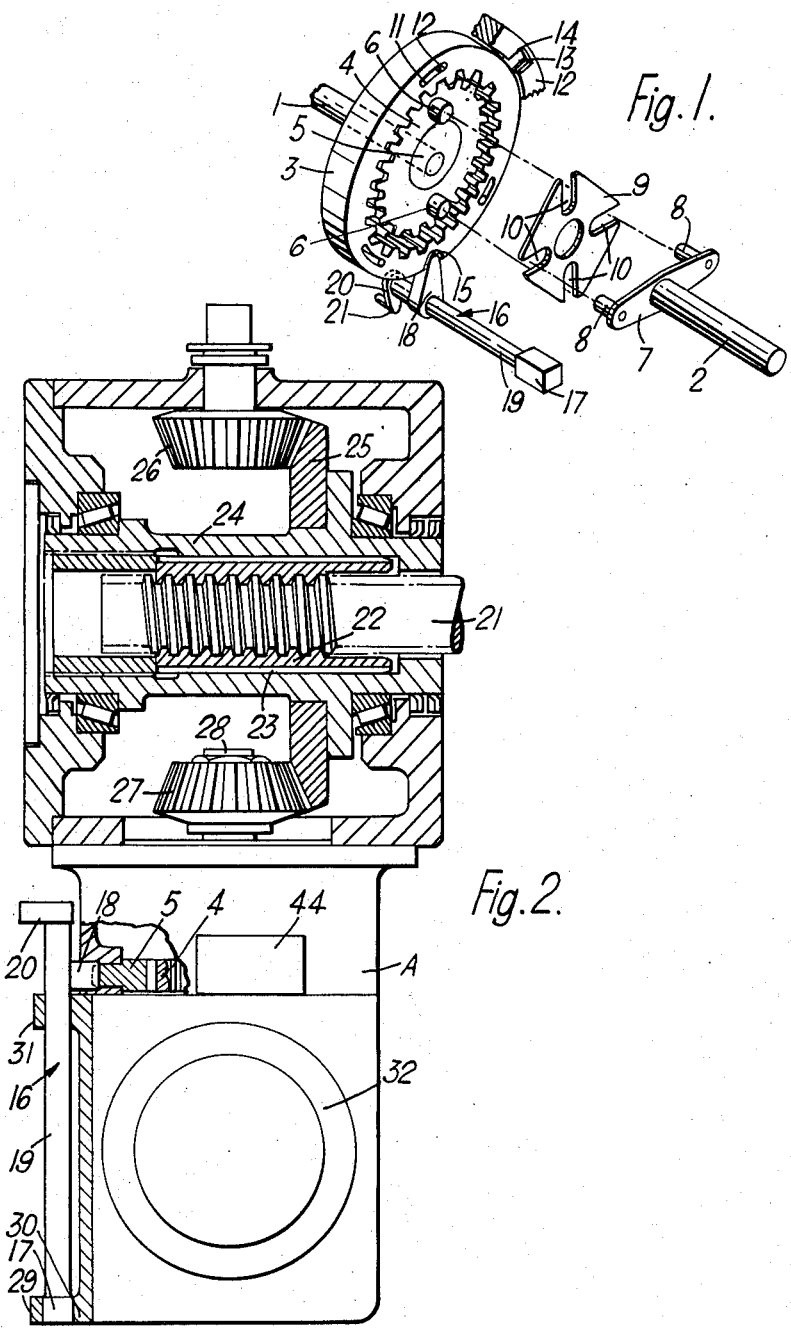
Inventors
GEORGE E. SMITH
RICHARD CHANTLER
By Imirie+Smiley
Attorneys

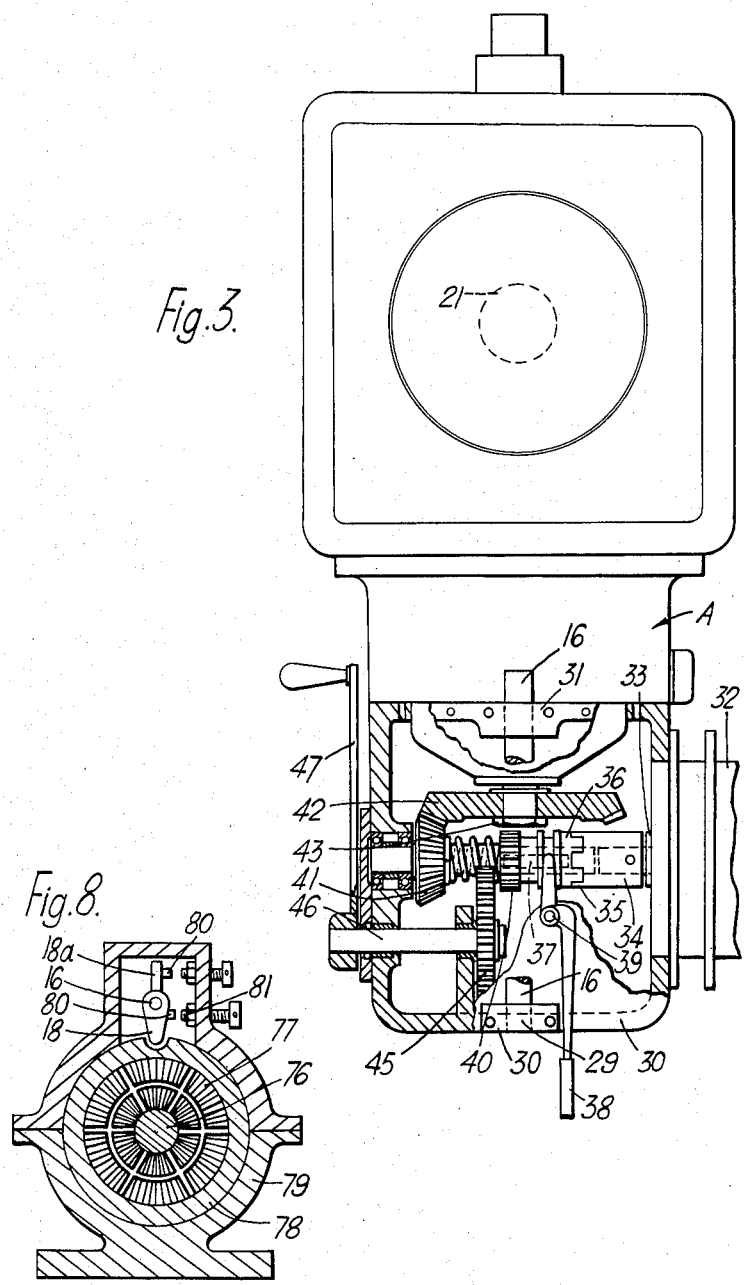

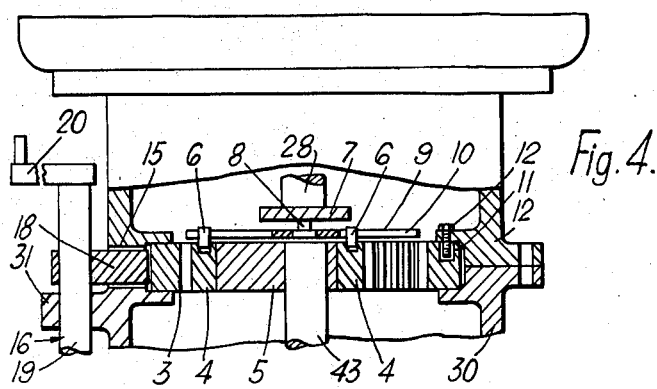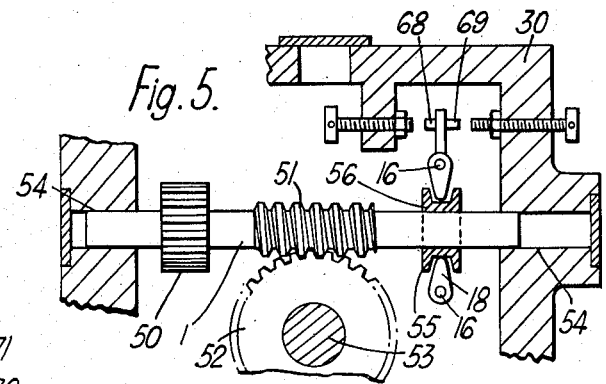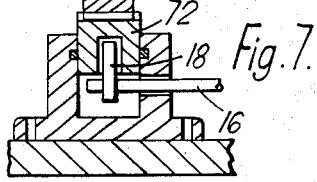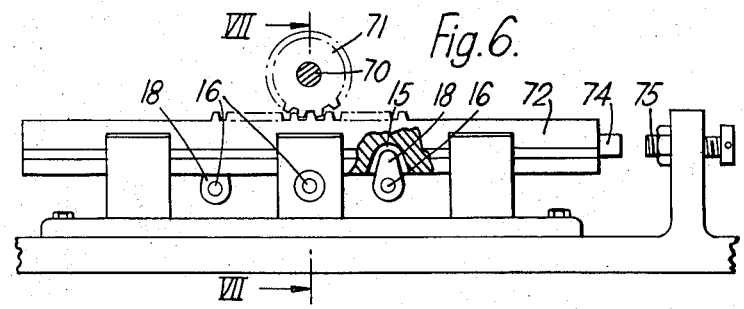

Nov. 2, 1965  G. E. SMITH ETAL  3,215,921
CONTROL DEVICES
Filed June 15, 1959 6 Sheets-Sheet 4

Inventors
GEORGE E. SMITH
RICHARD CHANTLER
By
*Imrie & Smiley*
Attorneys

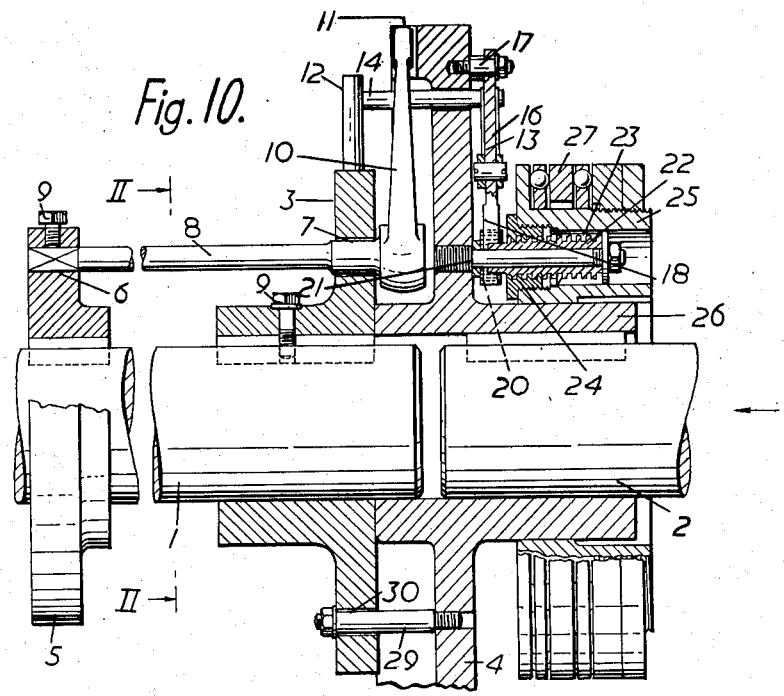

Nov. 2, 1965    G. E. SMITH ETAL    3,215,921
CONTROL DEVICES

Filed June 15, 1959    6 Sheets-Sheet 6

Inventors
GEORGE E. SMITH
RICHARD CHANTLER
By Imirie & Smiley
Attorneys

United States Patent Office 3,215,921
Patented Nov. 2, 1965

3,215,921
CONTROL DEVICES
George Egerton Smith and Richard Chantler, Chelmsford, England, assignors to Egerton Smith Engineers Limited, Chelmsford, England, a British company
Filed June 15, 1959, Ser. No. 820,368
Claims priority, application Great Britain, June 20, 1958, 19,910/58
16 Claims. (Cl. 318—475)

This invention relates to control devices for machines and mechanisms and more particularly to a device for controlling a machine or mechanism, having a member responsive to a predetermined load on the machine or mechanism to actuate a device for recording the load or to initiate variation of the operation of the machine or mechanism responsive to the load thereon.

In a drive transmission through which a drive is imparted from a prime mover, e.g., an electric motor or an internal combustion engine, to a mechanism or device to be driven, e.g., a circulating pump, spiral conveyor feet, a vehicle or a hoist, the output shaft of the transmission may become overloaded and to avoid the resultant and often undesirable strain on the transmission a safety control device or governor is frequently employed to reduce the load either by increasing or reducing the power input as by increasing, reducing or cutting off the current supply to the motor or the fuel supply to an internal combustion engine acting as the power source, or by actuating means to reduce the output load. Further where it is necessary to avoid substantial variation in the speed of the output shaft of the transmission, as for example in the production of artificial fibres where the thickness of the extruded fabric varies with very small speed variations of the extrusion unit, it is necessary to control the output shaft speed within closely defined limits. Again where a power drive is imparted to a member, such as a valve stem, it is necessary to stop or reverse the drive when the end of a predetermined movement is reached, such as when a valve carried by a valve stem for example is moved to the fully closed or fully open position. In testing apparatus such as brake testing apparatus, for efficiency testing devices, weighing machinery, screw efficiency testing or in tensile or compressive stress testing for example, it is necessary, where a power drive is employed in such apparatus, to record the progress of the tests and in some cases to vary, stop or reverse the drive imparted to the apparatus.

For such purposes a control device is necessary which is responsive to a load on the machine or mechanism, such as a drive transmission, at a predetermined limit or limits to cause variations in the output of the machine or mechanism to reduce the load, or to interrupt the drive or to apply a counter load in the opposite direction, or the control device may be associated with a recording device to record the load visually by a dial instrument or on a written record or audibly or by a warning bell or light for example.

The main object of the present invention is to provide a control device, applicable to any machine or mechanism, and employing a member strainable in direct proportion to the load thereon which when strained will actuate a recording device.

By a "recording device" is meant a device, apparatus or instrument which will record the strain in the strainable member and hence the load on the machine or mechanism being controlled, or a device or apparatus which when the strainable member is strained to one or more predetermined values will cause actuation of means to stop the power input to the machine or drive mechanism being controlled or the output load thereon, or modify or reverse the power input thereto or the output load thereon.

According to the present invention a control device for a mechanism comprises at least one twistable bar element having a portion fixable against rotation about its longitudinal axis and, spaced along said axis from the fixed portion, a portion operatively connected to a displaceable element of the mechanism which is capable of relative movement with respect to a part of the mechanism movable under load, the bar element being calibrated to restrain movement of the displaceable element when the loadable part of the mechanism is loaded within at least one predetermined limit, but when said load exceeds said limit will twist thereby permitting relative movement directly proportional to said load of the displaceable element with respect to said loadable part, one of said elements having means associated therewith for connection to a recording device.

From another aspect of the invention the control device for a drive mechanism comprises a displaceable element for operative connection to a movable part of the drive mechanism, a bar element having a portion fixable against rotation about its longitudinal axis and, axially spaced therefrom, a portion operatively connected to the displaceable element to restrain movement of the displaceable element when the mechanism is loaded within at least one predetermined limit, the part of the bar element between said portions being twistable when the mechanism is loaded to said limit to permit movement of the displaceable element directly proportional to said load, and a member for connecting one of said elements to a recording device as herein defined and responsive to movement of said elements when said mechanism is loaded to the said limit.

The device can be employed to operate by twisting of the bar element when the mechanism is loaded to predetermined limits of maximum and minimum permitted load.

The twistable portion of the bar element is preferably provided with a projection which may be radial engaging in a slot or the like in the displaceable element.

From yet another aspect, a control device according to the invention comprises an elongated torsion bar fixed against axial rotation towards one end thereof, a connection towards the other end of the torsion bar between the torsion bar and a displaceable element shaped to form a driving member of a mechanism to be controlled, the shape of the torsion bar and the connection between the torsion bar and the displaceable element being such that when the mechanism is loaded within a predetermined limit it will hold the displaceable member against displacement, but when the load on the mechanism reaches the predetermined limit the torsion bar will twist, the torsion bar being provided with means for association with a recording device responsive to twisting of the torsion bar.

In one preferred construction the control device comprises a rotatable driving member, a gear mechanism drivable by the driving member and incorporating a displaceable element, a torsion bar connected to the displaceable element so as normally to hold the displaceable element stationary, the torsion bar being fixed against axial rotation at a point thereon remote from the connection to the displaceable element, and a recording device operatively connected to the torsion bar, the torsion bar being so shaped that when a member driven by the gear mechanism is subjected to a load at a predetermined limit it will cause the torsion bar to twist and permit limited movement of the displaceable element in direct proportion to the load on the driving member or gear mechanism to actuate a recording device. The displaceable element may be an angularly displaceable rotary member.

The recording device may be operatively connected to means for imparting the drive to the driven member, said means being associated with a second control device so that when the displaceable element reaches the limit of its predetermined movement the torque imparted to the driving member is varied or reduced to zero. The movement of the displaceable member may be in either direction, the torque imparted to the driving member being varied, reduced to zero or reversed so that the load on the gear mechanism is reduced within predetermined limit or eliminated.

The displaceable element or the bar element may be provided with stop means to limit its movement, or be provided with limits in opposite senses so that the drive is alternately reversed from one direction to another to cause oscillation of a member to be controlled.

In another preferred construction the displaceable element is in the form of an internally toothed ring forming part of an epicyclic or hypocycloidal gear mechanism, an eccentrically driven epicyclic pinion meshes with a portion of said internal teeth to roll therearound and is drivingly connected through an Oldham-type or like coupling to a driven member loading of which beyond a predetermined limit or limits is to be controlled or prevented.

In a further preferred construction the drive mechanism includes a worm wheel and a worm pinion meshing therewith, the worm wheel being mounted to be axially displaceable when the member driven by the pinion is loaded to a predetermined limit or limits.

In yet another preferred construction, the drive mechanism includes a pinion meshing with a displaceable member in the form of a longitudinally movable rack.

From a further aspect the invention comprehends a machine in the form of an electric motor or dynamo, the fixed magnets of which are mounted on a displaceable element rotatably mounted on the motor or dynamo housing and the torsion bar is fixed relative to said housing and at a part axially spaced along the bar has a portion in engagement with the displaceable element so as to twist and permit movement of said element when the motor or dynamo is loaded to a predetermined limit or limits, the bar carrying at least one contact which on displacement at said limit or limits will engage a second contact to cut off the source of electric supply to the motor or the fuel to the prime mover driving the dynamo.

The invention further comprehends a drive transmission comprising a driven member, a driving member, a torsion bar one part of which is fixed against rotation about its longitudinal axis to one of said members to move therewith while another part of the bar axially displaced from the said fixed part is supported by and rotatable with respect to said member and has a projection engaged in a slot in the second member thereby drivingly coupling the two members together but so as to permit relative axial movement between said two members, and a control actuating member operatively connected to and movable with the displaceable part of the torsion bar to actuate a control device to vary the load on the drive transmission in direct proportion to the load when relative movement between the said members occurs due to the load on the driven member exceeding or falling below a predetermined limit or limits and twisting the torsion bar. The driven and driving members preferably comprise rotatable shafts and the torsion bar may be caused to rotate with the driven or the driving members. A number of torsion bars may be arranged around such a rotatable driven or driving shaft.

The control actuating member preferably comprises a member secured to each torsion bar by a quick-start thread so as to rotate with the driven or driving member on which the bar or bars is or are mounted, but will be moved axially with respect to each other by the quick-start thread in the event of the torsion bar being twisted, the control actuating member being coupled to a pivoted member which is displaced by the said axial movement of the actuating member to initiate adjustment of the drive imparted by or the load on the drive transmission.

In another preferred construction the driving and driven members comprise two coaxial shafts carrying contiguous coaxial radial flanges and the torsion bar is disposed substantially parallel to one shaft with its rotatable part rotatably supported in the flange carried by said shaft, the torsion bar having a generally radial projection part of which radially displaced from the bar axis is in engagement with the flange carried by the second shaft. A number of torsion bars may be disposed round the member, e.g., the driven member, to which they are fixed, each torsion bar carrying a projection connected to the other of the two members, e.g., the driving member.

The bar element may consist of a single bar, or a number of bars equally or differently twistable for a given torsion load thereon. Where two or more bars are provided these may be such as to twist through different angles for a given torsion load and each coupled to a recording device as herein defined through a multiple electric relay or switch operable to cause one or other of the bars to influence the drive imparted to the machine or mechanism.

Means may be provided for calibrating or setting the limit or limits on the bar element.

In order that the invention may be more fully understood some embodiments in accordance therewith will now be described by way of example with reference to the accompanying drawings, in which:

FIGURE 1 is a diagrammatical exploded view of a drive mechanism showing the connection of the torque control device thereto;

FIGURE 2 is a side view, partly in cross section, of a torque control device applied to the stem of a valve;

FIGURE 3 is a view looking from the right of FIGURE 2 showing parts broken away;

FIGURE 4 is a cross section of the torque control device shown in FIGURES 2 and 3;

FIGURE 5 is a side elevation partly in section of a worm drive governed by a torque control device;

FIGURE 6 is a side elevation of a driven shaft of a mechanism by which the operation of the mechanism is controlled by a rack and pinion device associated with a torque control device;

FIGURE 7 is a cross section on the line VII—VII of FIGURE 6;

FIGURE 8 is a diagrammatic transverse cross section through an electric motor operation of which is controlled by a torque control device;

FIGURE 10 is a cross section through a drive transmission on the line XI—XI of FIGURE 11 looking in the direction of the arrows;

FIGURE 11 is a cross section on the line XII—XII of FIGURE 10 looking in the direction of the arrows;

Figure 9:
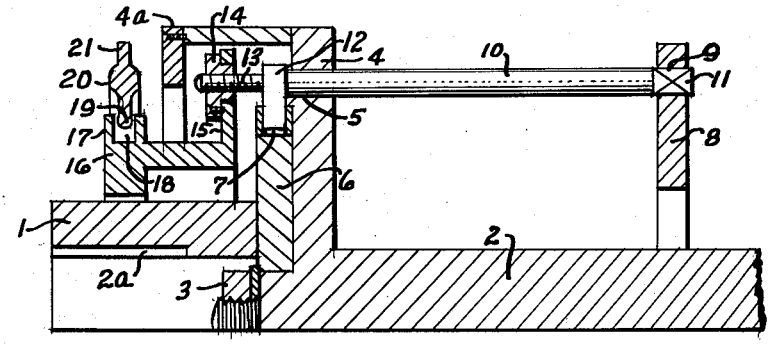
FIGURE 9 is a partial cross section of a transmission drive.
Figure 12:
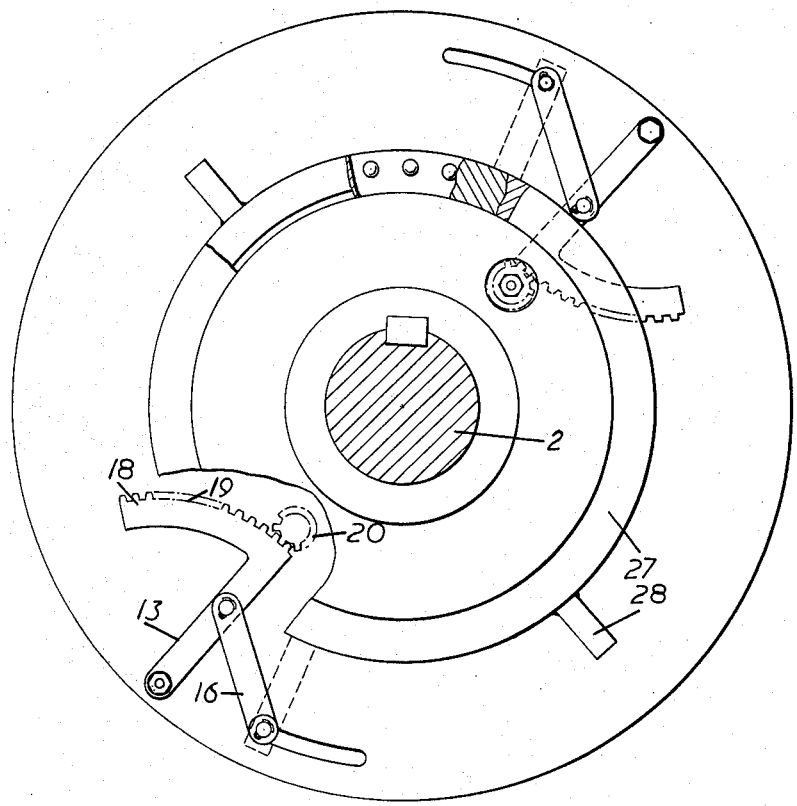
FIGURE 12 is an end view of the transmission shown in FIGURE 10 looking from the right.
Figure 13:
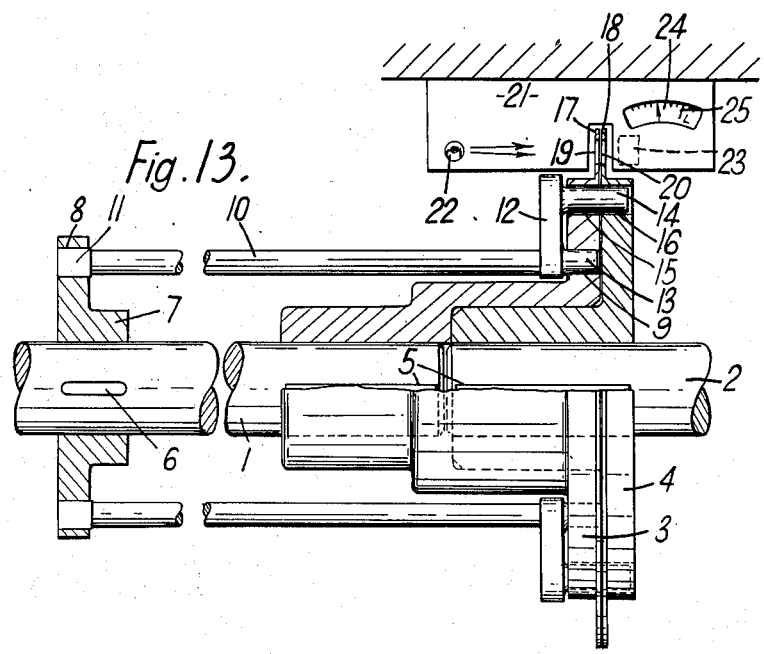
FIGURE 13 is a side elevation partly in cross section of a drive mechanism.
Figures 14, 15:
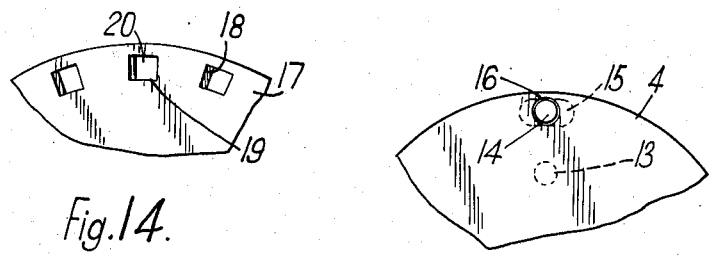
FIGURE 14 is a detail taken at the point A—A in FIGURE 13.
FIGURE 15 is a detail similar to FIGURE 14 looking from the right hand FIGURE 13.

In the drawings the same references are employed for the same or similar parts in FIGURES 1–8, in FIGURE 9, in FIGURES 10–12 and in FIGURES 13 through 15.

Referring to FIGURE 1 the drive mechanism is a hypocycloidal gear and includes an input or driving shaft 1, an output or driven shaft 2, an angularly displaceable member in the form of an internally toothed ring 3, and a pinion 4 rotatably mounted on an eccentric 5 secured to the shaft 1, the pinion 4 being of smaller diameter than the internal diameter of the ring 3 and meshing therewith and having two rotatably mounted studs 6 disposed thereon. The shaft 2 has a plate 7 on which two studs 8 are rotatably mounted in a plane transverse to the diameter of the studs 6, and a floating member 9 having two pairs of diametrically opposed slots 10, is disposed with the studs 6 and 8 engaged in said pairs of slots whereby drive from the pinion 4 to the snaft 2 is imparted through an Oldham-type coupling, or it may be imparted through any similar coupling.

The ring 3 is provided with two slots 11 in which engage pins 11a fixed to the housing 12 of the gear mechanism (not shown) in which the ring is rotatably located thereby permitting limited rotational movement of the ring 3 with respect to the shaft 1. Alternatively the ring 3 may have external projections 13 engaging in a slot 14 in the housing 12.

The ring 3 has in its periphery a slot 15; a torsion bar 16 is fixed with respect to the housing 12 at or near one end 17 while towards its other end the torsion bar 16 has a projection 18 secured thereon disposed to engage in the slot 15. Tne portion 19 of the bar 16 is supported in a bearing (not shown) in the housing 12 and the free end of the bar is provided with a member such as crank 20 for connection to a recording device as herein defined, bar 16 being a twistable rod element having a fixed portion 17, a projection 18, forming a torque arm and operatively connected to the driven ring 3, constitute the control device such that the bar 16 can twist within determined limits of torque imparted by the driving shaft 1 to the driven shaft 2 and said rod element is connected by the element 21 to a recording device as herein defined. The recording device forming no part of the present invention and therefore requiring no detailed description here, can be a conventional unit to disconnect or vary the power by which the shaft 1 is driven or a conventional device by which the load imparting the torque from the shaft 1 to the shaft 2 can be measured.

It will be seen that when the shaft 1 is rotated the pinion 4, through the eccentric 5, will gyrate and rotate within and in mesh with the teeth in the ring 3 and the drive will be imparted to the shaft 2 through the members 6, 9 and 8. Should the shaft 2 be under excessive load the reactionary force on the gear mechanism will tend to cause rotation of the ring 3 against the resistance of the torsion bar 16. The portion 16a of the torsion bar 16 between the end 17 and the projection 18 is of such length and diameter that when the ring 3 is caused to rotate to a predetermined limit in either direction by the load on the mechanism through the shaft 2, the portion 16a of the torsion bar will be twisted so that the crank 20 will be angularly displaced and operate the recording device. The length of the crank 20 can be chosen to give the necessary displacement of its end 21 for a very small angular displacement say 0.50 of the ring 3. The recording device may be one which merely actuates an apparatus or an instrument for portraying as on a dial or a graph the strain on the gear mechanism, or the recording device can cause actuation of a device for varying or stopping or reversing the drive imparted to the drive mechanism from its prime mover.

It must be emphasized that although FIGURE 1 discloses a hypocyclocidal gear any gear mechanism may be employed with the torsion bar in which a displaceable member is normally stationary or only moves well within the predetermined limit or limits, but at the said limit or limits will be displaced sufficiently to cause twisting of the torsion bar.

The recording device, when actuating the control means of the prime mover or the power supply control of an electric motor as the prime mover, may only effect such actuation when the limit of movement of the displaceable member is reached, or it may continuously cause such actuation in proportion to the amount of movement of the displaceable member, and may actuate in either direction of drive to cause reversal of the drive or cause oscillation of the driven member.

Referring to FIGURES 2 and 3 these show the application of a torque control device such as shown in FIGURE 1 to the control of a valve stem. Referring more particularly to FIGURE 2 this shows in the upper part of the housing a shaft 21 forming or connected to a valve stem to be opened or closed by a prime mover, or by hand as will be described, through a drive transmission. The shaft 21 is threaded onto an externally splined and internally threaded sleeve 22, the splines 23 of which mesh with similar members on a hollow shaft 24, the splines permitting lateral movement of the sleeve within this hollow shaft. Keyed to the hollow shaft is a bevel gear 25 meshing with two bevel pinions 26, 27 and the pinion 27 being keyed to a shaft 28 which corresponds to the shaft 2 in FIGURE 1. The pinion 26 is an idler pinion. The members 22–28 constitute the drive mechanism in this construction. The torque control device is shown diagrammatically in FIGURE 4 but is seen at A in FIGURES 2 and 3. The pinion 4 being seen in the lower half of FIGURE 2. The pinion 4 meshes with the ring 3 connected to the upper end of the torsion bar 16.

The torsion bar is fixed at its lower end 17 to a projection 29 on the housing 30 and its portion having the projection 18 is freely rotatably journalled in a projection 31 at the upper end of that housing.

Referring to FIGURE 3 the housing 30 has secured thereto the housing of an electrical motor 32 the drive shaft 33 of which is connected to a short shaft 34. The free end of the shaft 34 carries dog teeth 35 which mesh the teeth of a dog 36 slidable on a shaft 37 by means of a lever 38 pivoted at 39 to the housing 30 and extending below the lower wall of the housing. The dog 36 carries at its central portion a pinion 40 and at its free end has keyed thereon a pinion 41 meshing with a bevel wheel 42 secured to the shaft 43 which corresponds to the shaft 1 in FIGURE 1.

Thus it will be seen that when the motor is switched on and the lever 38 is in the position shown in FIGURE 3 the motor will, through thre gearing 41, 43, the shafts 43, 28 and the gearing 27, 26, 23, the shaft 24, the sleeve 22, rotate the shaft 21 to open or close the valve. When the valve reaches the open or closed position respectively the load imparted to the shaft 21 by further resistance to movement of the valve head will cause the ring 3 to rotate within its limits thereby twisting the portion 19 of the torsion bar 16. The torsion bar 16 is connected to a recording device 44 which on twisting of the bar 16 will trip a switch and cut out the current supply to the motor.

Referring again to FIGURE 3 if the lever 38 is moved to the right the dog teeth 35, 36 will be disconnected and the member 36 will slide to the left until the pinion 40 meshes with a pinion 45 keyed to a shaft 46 journalled in the housing and have a handle 47 thereon and thus the valve may be opened or closed manually by rotation of the handle 47, the motor drive being disconnected. Should the handle be rotated beyond the predetermined load position the bar 16 will be twisted to resist further loading and to free the load when the handle is released.

Referring to FIGURE 5 this shows the employment of the torsion bar control device for a worm drive. The worm drive consists of a shaft 1 to which a drive is imparted by a prime mover through a gearing, one pinion 50 of which is shown on the shaft, the shaft having a worm 51 meshing with a worm wheel 52 mounted on a shaft 53 to be driven. The shaft 1 is supported in bearings 54 and is capable of axial displacement. The control of this axial displacement is effected by means of the torsion bar 16 having a projection 18 engaging in an annular slot 55 in a member 56 fixed on the shaft 1. An additional torsion bar 16 and projection 18 may be provided on the opposite side of the member 56 as shown in FIGURE 5 to ensure a balanced axial movement of the shaft and avoid the tendency of bending the shaft.

In FIGURE 5 the upper bar 16 carries a double contact member 67 and two adjacent contact members 68 and 69 are mounted in the casing of the device 70 so that on displacement of the shaft 1 axially when the bars 16 twist, one of the contacts 67 will strike one of the contacts 68, 69 and thereby complete an electric circuit in which these contacts are disposed to cut off, vary or reverse the electric supply to the prime mover (which in this example is a prime mover) and thus affect the drive imparted through the shaft 63. Where the two torsion bars are provided as shown in FIGURE 5 it will of course be understood that each torsion bar will have a value of half that of the one torsion bar when one only is used for the same purpose: or the two bars may be of different value for the purpose herein specified. In use the torsion bar or bars holds the shaft 1 in the position shown in FIGURE 5 and the drive is imparted normally from the pinion 50 to the shaft 53; should the shaft 53 be loaded to a predetermined limit the resistance offered to the drive by that load will cause an axial force to be applied to the shaft 1 and cause the bar or bars 16 to twist and complete one of the contacts 67, 68, or 67, 69 and as soon as the drive is varied as a result of that contact the load on the shaft 63 will fall and the bars 16 will return the shaft 1 to the position shown in FIGURE 5. The gear 60 being a helical gear as shown will permit this axial movement of the shaft 1.

Referring to FIGURES 6 and 7 the drive mechanism includes on a shaft 70 a pinion 71 in mesh with a rack 72, the rack being provided with one or more slots 73 in which projections 18 on torsion bars 16 engage and prevent axial movement of the rack. At the end of the rack a contact 74 is provided which when the rack moves longitudinally a predetermined distance makes contact with an adjacent contact 75 coupled in the circuit from an electric device controlling the prime mover of the drive mechanism. Thus should the drive mechanism be loaded to a predetermned limit the shaft 70 will tend to turn and this will be restrained by the bars 16 but at a predetermined load the bars 16 will permit movement of the rack to complete the circuit 75, 74. A second contact 74 may be provided at the left hand end of the rack in FIGURE 6 or elsewhere on the rack to make the control effective in two directions of the drive.

Referring to FIGURE 8 this shows an electric motor having a rotor 76 and fixed magnet coils 77 the latter mounted in an annular displaceable member 78 rotatably slidable in the casing 79 of the motor. The member 78 is engaged by a projection 18 on the bar 16 and contacts 80, 81 are provided as in FIGURE 5.

The bar 16 may have a second projection 18a and the two contacts can be so disposed that each engages one of the projections 18, 18a when the member 78 is displaced. In operation if the motor is running normally the bar 16 holds the member 78 stationary but should the motor be loaded to a predetermined limit e.g. the burn out point then the magnetic field creates a force which will tend to move the fixed magnets 77 and hence the member 78 and when this force is sufficient to overcome the torsional resistance in the bar 16 it will cause the portion 16a of the bar to twist and the projection 18 or 18a or both the projections will open the power supply circuit to the motor thereby preventing burning out of the motor coils which would otherwise occur if the overload were sustained.

Also as shown in FIGURES 2 and 3 the control device may be applied to a hand operated mechanism to prevent the controlled mechanism being hand loaded beyond a desired limit or limits.

When the torsion bar on twisting actuates an electric or electronic control, the bar may be coupled to a switch so that the switch is closed at a predetermined load on the mechanism, and since this can be used in conjunction with a switch having a rotating member driven by the drive, when the first switch is closed the recording device will be operated as the rotating switch next closes. With multiple switches each of the first switches being responsive to a separate bar and the rotating switch being set for different loads, this multiple mechanism can cause a sequence of operations to be effected by the machine or mechanism controlled.

Referring to FIGURE 9 the drive transmission comprises a driving member in the form of a shaft 1 and a driven member shown as a shaft 2 coupled together as at 3 in a conventional manner so that one can rotate relative to the other. The shaft 1 is preferably short as shown and has a keyway 2a for connection to the output shaft of the prime mover. The shaft 2 carries a flange 4 having a number of circular bores 5 therein of which one is shown while the shaft 1 has an annular flange 6 of smaller diameter than the flange 4 and having therein one radial slot 7 in radial alignment with each bore 5 in the flange 4. A circular plate 8 is fixed to the shaft 2 and has a number of holes 9 each aligned axially with one of the bores 5 in the flange 4, each hole 9 having a non-circular cross section, for example, square.

A number of torsion bars, of which one is shown at 10 in FIGURE 9, are provided each with a squared end 11 fixed in one of the holes 9 and passing freely through the aligned bores 5 of the flange 4; each bar 10 carries a radial projection 12 near its free end, said projection engaging in one of the slots 7 in the flange 6.

It will thus be seen that when a drive is imparted to the shaft 1 this driving torque will be transmitted to the shaft 2 through the slots 7, the projections 12, the bars 10 and the flange 4. The bar 10 is of a material and is so dimensioned to have a predetermined torque resistance so that if the torque imparted to the shaft 1 by the prime mover is within predetermined upper and lower limits the bar 10 will remain rigid and the shaft 2 will be rotated at the same speed as the shaft 1. Should, however, the load on the transmission exceed or fall below the upper or lower predetermined limits respectively for which the torque resistance of the bar 10 is selected the bar will twist in its bore 5, while its other end remains fixed in its hole 9, causing a relative rotational movement between the shafts 1 and 2.

The free end of the bar 10 is provided with a quick start thread 13 meshing with a threaded member 14 secured to a flange 15 on a control actuating member 16 freely surrounding the shaft 1. The end of the member 16 remote from the flange 15 is provided with a radially slotted ring 17 and engaged in the slot 18 thereof is the nose 19 of a trunnion 20 fixed with respect to the bearings (not shown) in which the shaft rotates. The trunnion has a projection 21 which can be connected to any means movable by a displacement of the trunnion. Should the bar 10 twist as aforesaid the member 16 will be moved axially with respect to the shaft 1 by the quick-start thread 13 while rotating with the shaft 2, and this axial movement of the member 16 will cause the projection 21 of the trunnion to be displaced and thus move a lever or other device operatively connected to means for varying the load on the transmisison. Such variation may vary the torque transmitted by the driven member, or vary the load on or the output of the device, apparatus or the like driven by the shaft 2. A cover 4a is attached to the member 4.

Referring to FIGURE 10 the conveyor comprises a conveyor casing 22 to which pulverulent material carried in water is fed through a hopper 23; rotating in the casing 22 is an archemedian spiral conveyor 24 supported in bearings 25 at one end of the casing and in a spider 26 towards the delivery end of the casing. The shaft 27 of the conveyor is connected to or forms the driven shaft 2 of a drive transmission (D) of the kind shown in FIGURE 9, the shaft 1 of which is connected to a prime mover such as an electric motor 28. The projection 21 of the trunnion 16 of the drive transmission is connected to a recording device as herein defined.

The drive transmission of FIGURE 9 can be applied to any drive shaft or drive transmission in which the variation of the load on the driving or driven shafts or the output of the driven apparatus or the like needs continual adjustment automatically; for example, the drive transmission can be used in the drive of crushing mill rollers, where the pressure between the crushing rollers sometimes rises to the breaking point of the rollers, the torsional load on the drive shaft of the rollers increasing at the same time by employment of a drive transmission of the invention in the drive shaft of the roller or rollers, the rising torsional load in the shaft will result in the drive from the prime mover being cut out before the pressure between the rollers reaches the breaking point.

Referring to FIGURES 10 to 12 these show a drive transmission having a driving shaft 1 and a driven shaft 2. Each shaft carries a radial flange member 3 and 4 respectively, to rotate therewith. Flange 3 is located laterally on shaft 1 by locking screw 9A. The driving shaft 1 also has keyed thereto a flange member 5 and the flange members 3 and 5 are provided with bores 6, 7 respectively, the bores 6 preferably being non-circular, such as square in cross section, while the bores 7 are circular, each bore 6 being in axial alignment with a bore 7.

A twistable bar 8 is passed through each bore 7 and is fixed in the aligned bore 6 as by a squared end in a square bore, a locking screw 9 being provided. The part of the bar 8 passing through the bore 7 is free to rotate, but is supported therein, and beyond the flange 3 has secured thereto a projection shown as a radial arm 10 the outer end of which is a free fit in a slot 11 in the flange 4. Ten bars 8 are shown but one or any other number may be employed preferably equi-angularly disposed round the shafts 1, 2.

It will be seen that the drive is imparted from the shaft 1, through the flange 3, the torsion bars 8, the arms 10 and the flange 4 to the shaft 2 and when torque is imparted by the transmission the bars 8 will twist and relative angular movement between the flanges 3, 4 will occur but the drive is still imparted. This relative movement which is directly proportional to the amount of torque being transmitted is employed to effect an adjustment of the load responsive to the drive.

To achieve such adjustment the flange 3 carries one or more, in the drawings two, radial arms 12 which rotate solidly therewith. Each arm 12 has fixed to it a pin or the like shown as a rod 14 disposed parallel to the axis of the shafts 1, 2 and passing freely through a slot 15 in the flange 4 concentric with the shafts 1, 2 so that when relative angular movement between the shafts 1, 2 occurs the rods 14 can move in the slot. The length of the slot, extending in FIGURE 11 through an arc of about 17° or in FIGURE 12 to 25°, but in any case greater than the maximum angle of deflection permissible in each bar 8 and also greater in area than slot 30 which defines the limits of said relative angular movement.

Each rod 14 extends beyond the flange 4 and has pivoted to it a link 16 the other end of which is pivoted to a quadrant 13 in turn pivoted at 17 to the flange 4 with a segmental arm 18 carrying teeth 19. The teeth 19 mesh with a pinion 20 freely journalled on an axle 21 in turn fixed to the flange 4 and is fixed to a hollow sleeve 22 also on the axle 21 and having a multi-start thread 23; thread 22 is threaded into a bush 24 fixed to an annulus 25 freely journalled on the boss 26 integral with the flange 4 and keyed to the shaft 2.

Thus movement of the rod 14 in the slot 15 when said relative angular movement occurs, through the link 16, pivots the quadrant to rotate the sleeve 22 and thus moves the annulus 25 axially to throw a member such as trunnion 27, the arms 28 of which are shown in FIGURE 12, which is adapted to be connected to a control device such as the actuating rod of an internal combustion engine fuel valve.

The torsion bar may be chosen as to length, between the fixed part 5 and the flange 3, diameter, material such as high tensile steel or an alloy steel, and radial distance from the axis of the shafts 1, 2, to give the degree of control require by relative angular movement between the shafts 1, 2. The material of the torsion bar or bars is one possessing the strength properties to give the requisite torsional strength and to twist within the elastic limit of the material in the dimensions selected. The length of the arm 10 is selected, to provide the desired amplification of said relative rotary motion, and may engage slots radially inwards of the rods 14: or the bars 8 may be mounted radially further outwards than in FIGURES 10 to 12.

Further the end of one of the shafts 1, 2 may be of smaller diameter than the other and be a free rotating fit in the bore of the opposite coupling 3, 4, in order to ensure concentricity of the coupling.

Also the end of the bar 8 to the right of the arm 10 may have a quick-start thread device similar to that disclosed in FIGURES 9 and 10 connected to the flange 4 so as to move the bush 26 and the quadrant assembly on it thereby increasing the throw of the trunnion 27, the slot 15 and the rod 11 being long enough to permit such additional movement. The arms 10 may be at an angle other than 90° to the axis of the bars 8 and may be curved or cranked if required.

Studs 29 which are fixed by threading into flange 4 pass through angular slots 30 in flange 3 in which they are free to slide. Nuts 31 are adjustable to allow free movement of the studs 29 within the slots so as to maintain the correct axial relationship of flange 3 to flange 4. The studs 29 and slots 30 may be arranged to pre-set the torsion bar or bars to twist at a predetermined limit or limits.

The torsion bars are shown on the driving member, but the transmission may be reversed, i.e., shaft 2 is the driving member in the drawing. By means of a transmission in accordance with the invention such as that described with reference to the drawings, an overload or underload on the drive is translated into a linear movement, or another movement which may be rotary, to actuate any other machine, mechanism or apparatus, and is particularly suitable to act as a governor control on the primary mover imparting the drive.

Referring to FIGURES 12 and 13 these show a drive transmission having a driving member shown as a shaft 1 and a coaxial driven member shown as shaft 2, each shaft carrying a coupling member, 3, 4 respectively, in the form of contiguous radial flanges secured, as by keys 5, to or in one piece with and coaxial with its shaft to rotate therewith. The shaft 1 has fixed thereto as by a key 6 a flange 7 and the flanges 7 and 3 have bores 8, 9 respectively in alignment, the bore 8 being preferably non-circular such as square cross section as shown, while the bore 9 is circular.

A torsion bar 10, which is twistable, is parallel to the common axis of the shafts and is fixed by a shaped end 11 in the bore 8 and at its other end it has a projection 12 secured to it, the projection extending away from the longitudinal axis of the bar and is shown as generally radial. The projection has a stud 13 formed as an extension of the bar 10 and is engaged rotatably in the bore 9. The projection carries a second stud 14 which extends freely through an arcuate slot 15 in the flange 3 and is rotatably engaged in a bore 16 in the flange 4, the centre of curvature of the slot 15 being on the axis of the bar 10.

Thus when the shaft 1 is rotated by a prime mover the flanges 7 and 3 with the bar 10 rotate as a unit therewith and the stud 14 imparts the drive to the flange 4 and shaft 2. The bar 10 is so dimensioned and shaped and of such material, for example high tensile steel, that when a drive is imparted, the bar 10 will twist so that there is relative angular movement between the shafts, such movement being directly proportional to the amount of torque being transmitted.

The flanges 3, 4 carry control elements 17, 18 respectively which may be radial projections or may extend ringwise round the peripheries of the flanges and may be integral with or secured to the flanges. The elements 17, 18 have apertures 19, 20 (FIGURE 13) which are in register when the transmission is at rest, but which move partially out of register to reduce the combined aperture in proportion to the torque transmitted.

A detector device shown generally at 21 is disposed in association with the control elements, and has a light source 22, such as an electric bulb, which directs light rays through the apertures 19, 20 onto a photoelectric device 23 of conventional type such as selenium cell in an electric circuit containing a detector shown in the form of an indicator 24. Thus as the flanges 3, 4 rotate the amount of light impinging on the device 23 will initiate a signal in the electric circuit which will cause actuation of the indicator. The indicator can be calibrated to indicate the torque as such or in horse-power, pounds-inches, or other appropriate units. The indicator may carry a limit mark 25 so that the operator can take appropriate action to reduce the torque in the transmission should the needle on the indicator pass the limit mark.

It may be highly desirable to ensure that the torque is kept within predetermined limits and for this purpose, in addition to or as an alternative to the indicators dial, warning bell or other signal, the photoelectric cell circuit includes a device such as a relay which is actuated when the torque reaches a predetermined limit to cause automatic adjustment of the torque, as by lessening the load on the drven shaft 2 or by reducing the power input to the prime mover as described with reference to FIGURES 1-8, FIGURE 9 and FIGURES 10-12.

A number of torsion bars may be disposed round the shaft 1, or the bar or bars may be fixed to the shaft 2, each torsion bar being provided with projections and studs as described with respect to the drawings.

A single control element may be provided but in that case the light source or the photoelectric device would rotate with the shaft carrying the element, the photoelectric device or light source respectively being stationary; a slip ring or like means would however be necessary to carry the energising current to the device or light source.

The torque responsive apparatus, i.e., the indicator 21, may be calibrated to indicate and/or initiate a signal for a lower predetermined limit if desired. The electric circuit of the photoelectric device may form part of a rejector circuit such that signals initiated by the device 23 beyond a limit are passed to a device to actuate torque adjusting device.

The torsion control device according to the invention is applicable to any drive operating through a displaceable member, the torsion bar or bars acting as a control or governor and operating a dial or graphical or other recording device or instrument or a visual or sound warning device, or through a solenoid, relay, limit switch, resistor or other suitable device, to operate a mechanical, electrical, electronic, pneumatic or hydraulic control or a brake device or clutch, to vary, stop or reverse the drive of a prime mover from which the drive transmission is driven such as an electric motor or an internal combustion engine. The control device can be used to control the feed or flow of materials or fluids such as the supply or coolant or lubricants being circulated through or to a mechanism or apparatus as in a refrigerating plant for example, or the fuel supply to an internal combustion engine forming the prime mover of the drive mechanism.

Further the torque control device can be used for continuous measurement such as of brake efficiency, for example brake fade, or for fan efficiency tests, or for the control of any mechanism or apparatus such as an extrusion plant used in the manufacture of synthetic fibres for example, as for the operation of valves, or for the control of machine drives or drive mechanisms.

The control device may be capable of controlling an infinitely variable load from any degree above zero to a maximum loading within physical limits of the particular torsion bar or torsion bars selected for a particular service or application, the degree of loading being determined by the setting of the extent of torsion bar adjustable electrical contact gap so that for any given dimension and material of torsion bar or bars the maximum load setting is obtained by increasing the electrical contact gap i.e., the torsion bar must be twisted farther in order to close the contact points and vice versa.

A control of more than one operation loading can be obtained by the insertion of more than one torsion bar in the same drive mechanism and a master control either automatic or manual may be used to select the load condition at which the drive is to be stopped and or reversed or restarted. Such a control in the field of automation having many applications in regard to limiting devices and remote control of sequence operations.

We claim:

1. The combination of a machine having a driving member and a driven member with a control device forming at least part of a coupling drive connection between said driving and driven members for indicating and regulating a load on the driven member, said control device comprising at least one twistable rod element having a fixed portion secured against rotation about its own axis and connected to one of said driving and driven members to rotate therewith, a torque member secured to said twistable rod element at a part spaced from said fixed portion, said torque member being operatively connected to the other of said driving and driven members so that the twistable rod element and torque member transmit driving force between the driving and driven members, said torque member serving to twist the rod element upon relative rotational displacement of the driving and driven members, and load indicating and control means so connected to said twistable rod element as to move in proportion to the amount of twisting of said element.

2. The combination according to claim 1 wherein said driving and driven means comprise rotating driving and driven shafts and said fixed portion of the twistable rod element is secured to one of said shafts to rotate therewith about the shaft axis.

3. The combination according to claim 2 wherein said torque member is an arm secured at one end to the twistable rod element and connected at the other end to a flange secured to the shaft corresponding to said other of said driving and driven members.

4. The combination according to claim 3 wherein said other end of said torque arm is engaged in a slot in said flange.

5. The combination according to claim 1 wherein said twistable rod element is calibrated to restrain relative movement of the driving member with respect to the driven member when the machine is loaded within maximum and minimum predetermined limits, but will twist when said load exceeds said limits.

6. The combination according to claim 4 wherein is provided a number of angularly spaced twistable rod elements parallel to said one shaft, said load control means comprising a high pitch threaded member secured to each twistable rod element to rotate therewith, a coupling member threaded on said threaded members and movable axially of the twistable rod elements when the rod elements are twisted, and a pivoted member for connection to a load control engageable with said coupling member and which is displaced by the axial movement thereof.

7. The combination according to claim 2 wherein the driving and driven means comprise two coaxial shafts carrying contiguous coaxial radial flanges, and the twistable rod element is disposed substantially parallel to one shaft with said spaced part rotatably supported in the flange carried by said shaft, said torque member being a generally radial arm having its outer end in engagement with the flange carried by the second shaft.

8. The combination according to claim 7 wherein said radial flanges have pairs of aligned apertures normally in register through which rays from a light source pass but such that relative angular displacement of the radial flanges will vary the size of the combined aperture of each pair of aligned apertures, a photoelectric device adapted to initiate a signal proportional to light passing through said combined apertures, and an indicator connected to said photoelectric device to display the load imparted as a mathematical function of the torque in the driving and driven shafts.

9. The combination according to claim 7 wherein is provided a number of angularly spaced twistable rod elements parallel to said one shaft, said load control means comprising an axially movable control sleeve positioned about said other shaft, a high pitch threaded member threadedly engaging said sleeve and means for turning said threaded member comprising a crank lever pivoted to one of said flanges and link means connecting said crank arm to the other of said flanges whereby to turn the threaded member in proportion to the relative angular displacement of said flanges.

10. The combination with a machine having a driving means and a driven means adapted to be driven under a load, of a control device for indicating or regulating said load, said control device comprising a displaceable element so connected to said driving and driven means as to move in proportion to the relative displacement of one means with respect to the other means, at least one twistable rod element having a fixed portion secured against rotation about its own axis, a torque member secured to said twistable rod element at a part spaced from said fixed portion, said torque member being operatively connected to said displaceable element to restrain movement thereof and to be moved by the displaceable element to twist the rod element within predetermined limits of torque imparted by the driving means to the driven means, and a load control element connectable to a load indicator or regulator connected to one of said rod and displaceable elements and responsive to the twist in said rod element to move in accordance with the amount of said twist.

11. The combination according to claim 10 wherein said machine is a dynamo having a housing, said driving means being electromagnets and said displaceable element is an annular member rotatably mounted in said housing and carrying said electromagnets.

12. The combination according to claim 11 wherein said twistable rod element carries at least one contact engageable on twisting of the bar with a second contact to cut off supply of electric energy to said electromagnets.

13. In a load reactive machine the combination according to claim 10 wherein one of said twistable rod and displaceable elements is provided with stop means to limit its movement.

14. The combination according to claim 10 wherein said driving and driven means are connected to said displaceable element by a gear mechanism.

15. The combination according to claim 10 wherein the displaceable element is an internally toothed ring forming part of a sun and planet gear, and an eccentrically driven internal pinion, forming part of said driving means, meshes with a portion of said toothed ring to roll therearound and is drivingly connected through an Oldham-type coupling to said driven means.

16. The combination according to claim 10 wherein the torque resistance of said twistable rod element is such as to restrain movement of said displaceable element with respect to the loaded part of said mechanism within predetermined maximum and minimum load limits but to twist outside said limits.

References Cited by the Examiner
UNITED STATES PATENTS

| | | | |
|---|---|---|---|
| 2,005,891 | 6/35 | Elberty | 318—475 |
| 2,222,716 | 11/40 | Mayeoch | 318—475 |
| 2,387,533 | 10/45 | Schmucker | 318—475 |
| 2,422,905 | 6/47 | Jackson | 192—142 |
| 2,484,616 | 10/49 | Dulaney | 318—475 |
| 2,513,784 | 7/50 | Blomquist | 198—64 |
| 2,517,373 | 8/50 | Ambrose | 318—475 |
| 2,600,568 | 6/52 | Nelson | 318—475 |
| 2,721,301 | 10/55 | Unk | 318—475 |
| 2,782,902 | 2/57 | Sloane | 318—475 |
| 2,888,128 | 5/59 | Allen | 198—64 |
| 2,909,671 | 10/59 | Frederick | 290—40 |
| 2,949,541 | 8/60 | Addie et al. | 290—40 |

ORIS L. RADER, *Primary Examiner.*

HUGO SCHULZ, SAMUEL LEVINE, *Examiners.*